(12) United States Patent
Kawamoto et al.

(10) Patent No.: US 11,549,561 B2
(45) Date of Patent: Jan. 10, 2023

(54) DISK ROTOR OF VEHICLE BRAKE

(71) Applicant: MAZDA MOTOR CORPORATION, Hiroshima (JP)

(72) Inventors: Yoji Kawamoto, Aki-gun (JP); Natsumi Sato, Aki-gun (JP); Shunsaku Shibata, Aki-gun (JP); Tomoki Nakayama, Aki-gun (JP); Shoji Goto, Aki-gun (JP); Yuki Ikawa, Aki-gun (JP); Kentaro Ota, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 108 days.

(21) Appl. No.: 17/064,478

(22) Filed: Oct. 6, 2020

(65) Prior Publication Data

US 2021/0108689 A1    Apr. 15, 2021

(30) Foreign Application Priority Data

Oct. 9, 2019 (JP) .............................. JP2019-185882

(51) Int. Cl.
*F16D 65/12*    (2006.01)
*F16D 65/02*    (2006.01)

(52) U.S. Cl.
CPC ......... *F16D 65/128* (2013.01); *F16D 65/127* (2013.01); *F16D 2065/1316* (2013.01); *F16D 2065/1324* (2013.01); *F16D 2065/1332* (2013.01); *F16D 2065/1384* (2013.01)

(58) Field of Classification Search
CPC ... F16D 65/123–128; F16D 2065/1316; F16D 2065/1324; F16D 2065/1332; F16D 2065/1384
USPC .................. 188/218 XL, 264 A, 264 AA
See application file for complete search history.

(56) References Cited

U.S. PATENT DOCUMENTS

| 5,526,905 | A  | * | 6/1996 | Shimazu | ................... | B60T 5/00 |
| | | | | | | 188/218 XL |
| 8,668,058 | B2 | * | 3/2014 | Lu | ......................... | F16D 65/847 |
| | | | | | | 188/218 XL |
| 2009/0057077 | A1 | * | 3/2009 | Mears | ................... | F16D 65/128 |
| | | | | | | 188/218 XL |

FOREIGN PATENT DOCUMENTS

JP        2008-095941 A    4/2008

* cited by examiner

*Primary Examiner* — Christopher P Schwartz
(74) *Attorney, Agent, or Firm* — Studebaker & Brackett PC (57) ABSTRACT

A disk rotor of a vehicle brake with improved efficiency in cooling the disk rotor by a synergy effect that comes from ensuring velocity of airflow flowing between cooling fins, ensuring surface areas of the cooling fins, and generating turbulent flow by second fins. A plurality of cooling fins each extending radially from an inner peripheral edge to an outer peripheral edge of a disk rotor are provided inside the disk rotor at intervals in the circumferential direction. Each of the plurality of the cooling fins includes a radial fin extending radially and a second fin spaced apart from the radial fin in the radial direction.

5 Claims, 11 Drawing Sheets

| | COMPARATIVE EXAMPLE (FIG. 10) | EXAMPLE 2 (FIG. 9) | EXAMPLE 1 (FIG. 8) |
|---|---|---|---|
| HEAT TRANSFER COEFFICIENT h | 100% | 103% | 106% |
| SURFACE AREA A | 100% | 100% | 105% |
| h × A (COOLING EFFICIENCY) | 100% | 103% | 111% |

DISK ROTOR OF VEHICLE BRAKE

TECHNICAL FIELD

This disclosure relates to a disk rotor of a vehicle brake including multiple cooling fins provided inside the disk rotor at intervals in a circumferential direction and extending radially from inner to outer peripheral edges of the disk rotor.

BACKGROUND ART

Ventilated disk rotors including an inner sliding face and an outer sliding face have been known. Specifically, a ventilated disk rotor includes multiple cooling fins arranged at intervals in a circumferential direction and each extending radially and continuously from inner to outer peripheral edges of the disk rotor between the inner sliding face and the outer sliding face thereof, as disclosed in Japanese Patent Laid-Open No. 2008-95941.

This disk rotor is configured to cool itself by taking traveling air from an inner periphery of the disk rotor into a ventilation hole between circumferentially adjacent cooling fins and discharging it from an outer periphery of the disk rotor. However, a need exists for further improving efficiency in cooling the disk rotor, and room has been left for improvement in this respect.

SUMMARY

Hence, this disclosure aims to provide a disk rotor of a vehicle brake with improved efficiency in cooling the disk rotor by a synergy effect that comes from ensuring velocity of airflow flowing between cooling fins, ensuring surface areas of the cooling fins, and generating turbulent flow by second fins.

A disk rotor of a vehicle brake of this disclosure includes a plurality of cooling fins provided inside the disk rotor at intervals in a circumferential direction and each extending radially from an inner peripheral edge to an outer peripheral edge of the disk rotor. Each of the plurality of cooling fins includes a radial fin extending radially and a second fin spaced apart from the radial fin in a radial direction.

With this configuration, each cooling fin is split into the radial fin and the second fin, and this helps more efficiently cool the disk rotor by the synergy effect that comes from ensuring the velocity of airflow flowing between the circumferentially adjacent cooling fins, ensuring fin surface areas, and generating turbulent flow by the second fin. In particular, turbulent flow can be generated by the second fin. The heat transfer coefficient of this turbulent flow is significantly larger than that of laminar flow, thereby helping improve efficiency in cooling the disk rotor.

In one aspect of this disclosure, the radial fin is composed of an oval fin having an oval shape, the second fin is formed with a shorter length than a length of the oval fin in the radial direction of the disk rotor, and the oval fin is provided on an inner periphery side, and the second fin is provided on an outer periphery side. With the above configuration, pumping performance by the oval fin positioned on the inner periphery side helps improve the airflow velocity, and this airflow with improved velocity can bring about turbulent flow at the second fin.

In one aspect of this disclosure, the oval fin is provided over a half or more of a length of the disk rotor in the radial direction thereof, and the second fin includes a plurality of second fins having a perfect or approximately perfect circular shape and provided in a direction extending from the oval fin.

With the above configuration, the oval fin is made as long as, or longer than, a half of the disk rotor in the radial direction thereof, and this allows obtaining sufficient pumping performance, thereby helping ensure sufficient airflow velocity.

This helps further improve the efficiency in cooling the disk rotor by the synergy effect that comes from ensuring this airflow velocity, ensuring the surface areas by the oval fin and the second fins, and generating turbulent flow by the multiple second fins.

In one aspect of this disclosure, between circumferentially adjacent two of the plurality of cooling fins, a third fin is provided at least one of between the oval fin and the second fin and between the plurality of second fins, and a total of outer peripheral areas of the oval fin, the second fins, and the third fin are made larger than an outer peripheral area of a cooling fin when the cooling fin is formed of a single radial fin alone.

With the above configuration, the third fin can compensate for decrease in brake surface pressure at the gap between the radially extending oval fin and the second fin or between the second fins. Also, increase in the outer peripheral surface area helps further improve the efficiency in cooling the disk rotor.

In one aspect of this disclosure, inner and outer edges of the third fin radially overlap edges of the oval fin and the second fin adjacent to each other in the radial direction. With the above configuration, the fins are continuously present in the radial direction of the disk rotor, thereby helping further stabilize the brake surface pressure.

This disclosure helps improve efficiency in cooling the disk rotor by a synergy effect that comes from ensuring velocity of airflow flowing between the cooling fins, ensuring surface areas of the cooling fins, and generating turbulent flow by the second fins.

DETAILED DESCRIPTION

Accordingly, improving efficiency in cooling the disk rotor by a synergy effect that comes from ensuring velocity of airflow flowing between the cooling fins, ensuring surface areas of the cooling fins, and generating turbulent flow by the second fins has been accomplished with a disk rotor of a vehicle brake including a plurality of cooling fins arranged inside the disk rotor at intervals in a circumferential direction and each extending radially from an inner peripheral edge to an outer peripheral edge of the disk rotor. Each of the plurality of cooling fins includes a radial fin extending radially and a second fin spaced apart from the radial fin in a radial direction.

EXAMPLES

Figure 1:
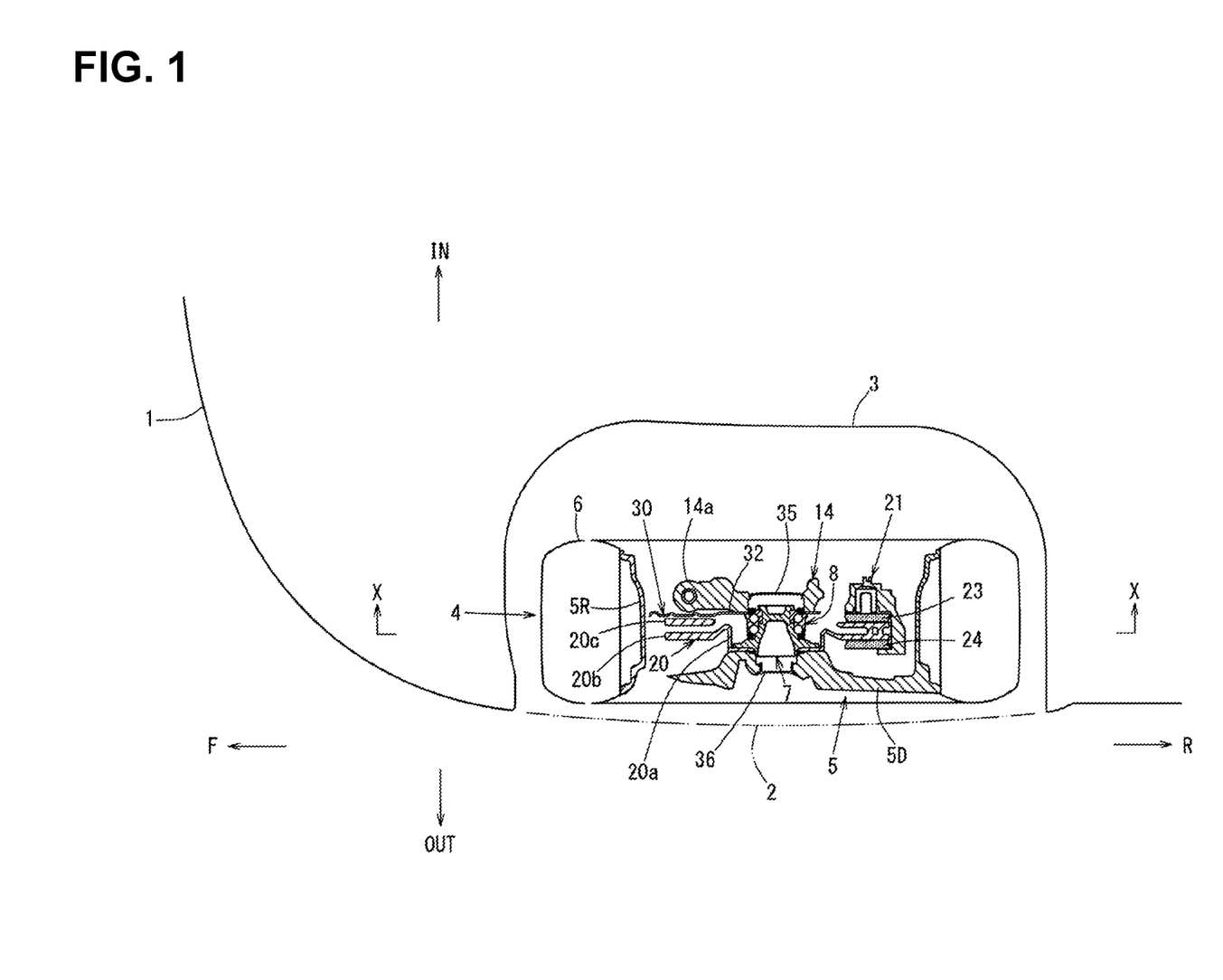
FIG. 1 is a schematic plan view showing a structure of a left front portion of a vehicle including a disk rotor of a vehicle brake of the present disclosure.
Figure 2:
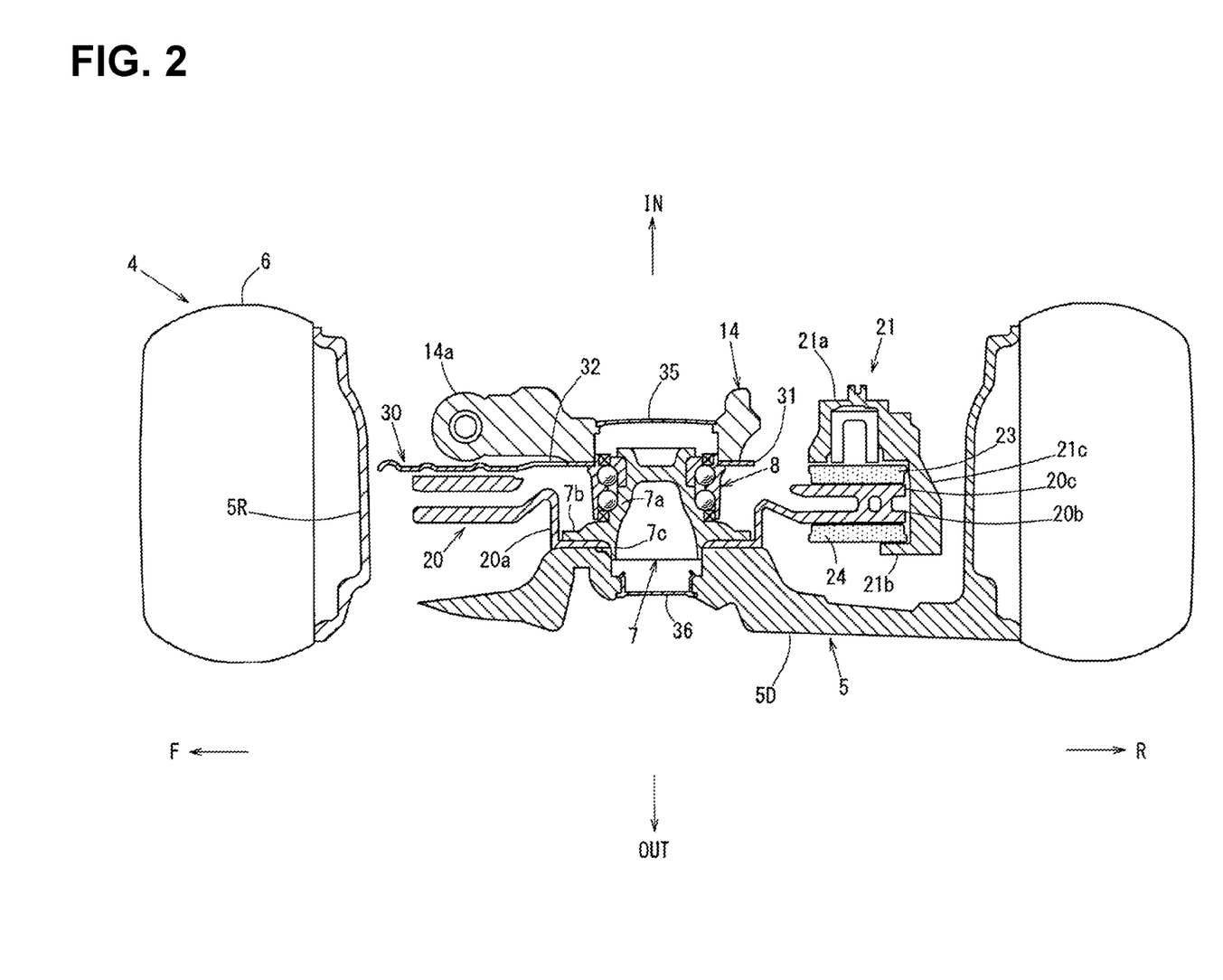
FIG. 2 is a sectional view of a wheel assembly including the vehicle brake.
Figure 3:
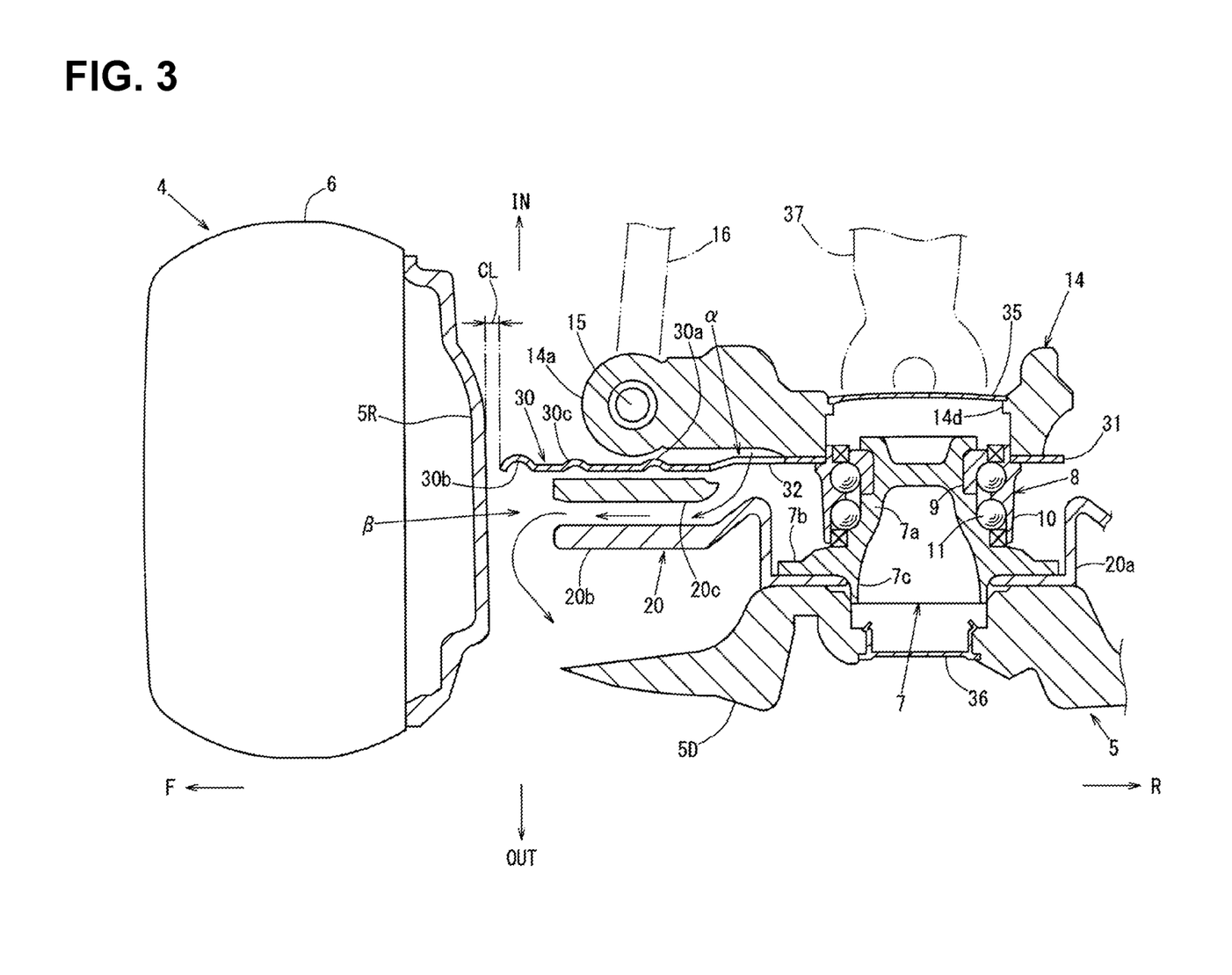
FIG. 3 is an enlarged sectional view of major parts in FIG. 2.
Figure 4:
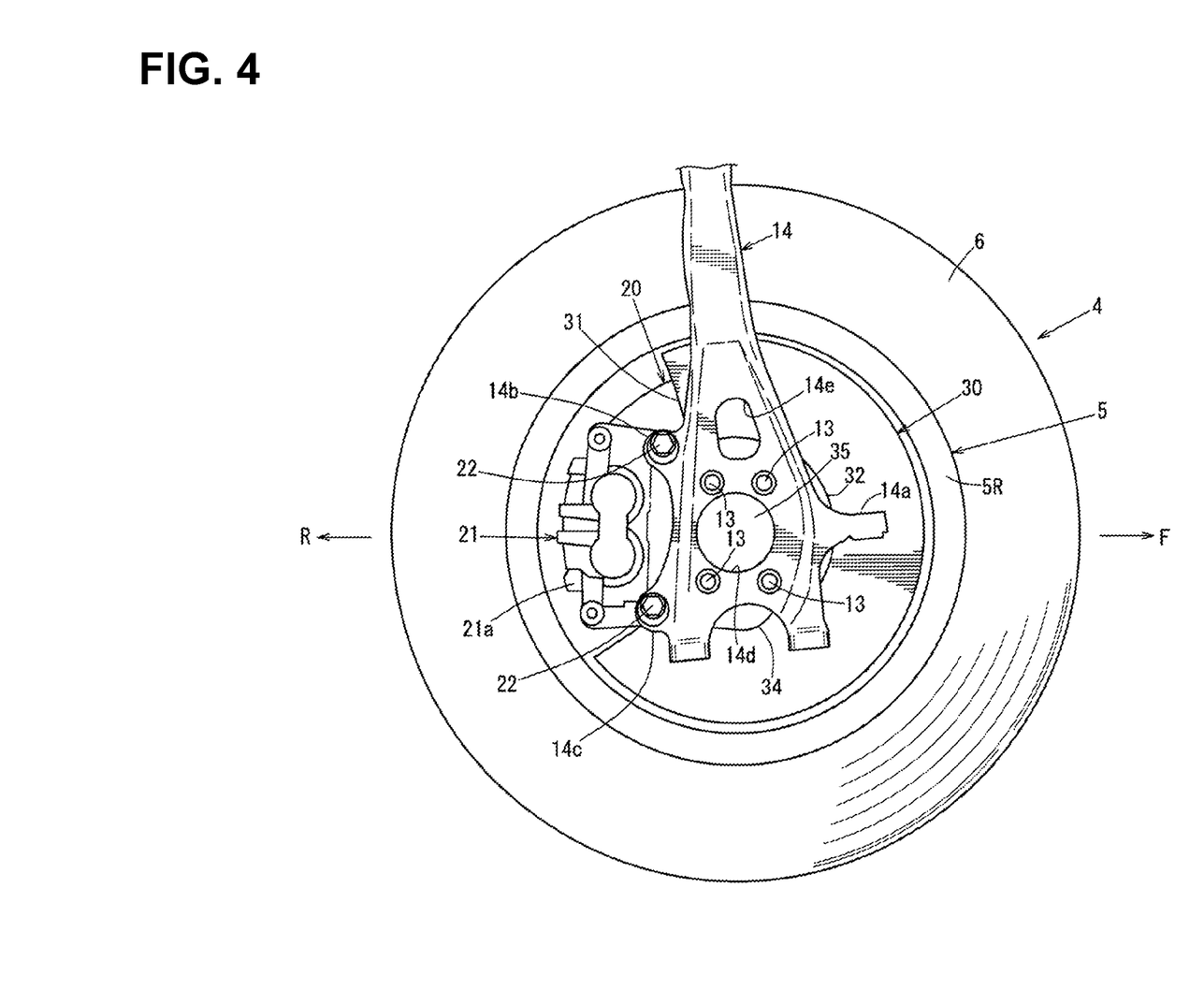
FIG. 4 is an inner side view of the wheel assembly as viewed from a vehicle-width-direction inner side.
Figure 5:
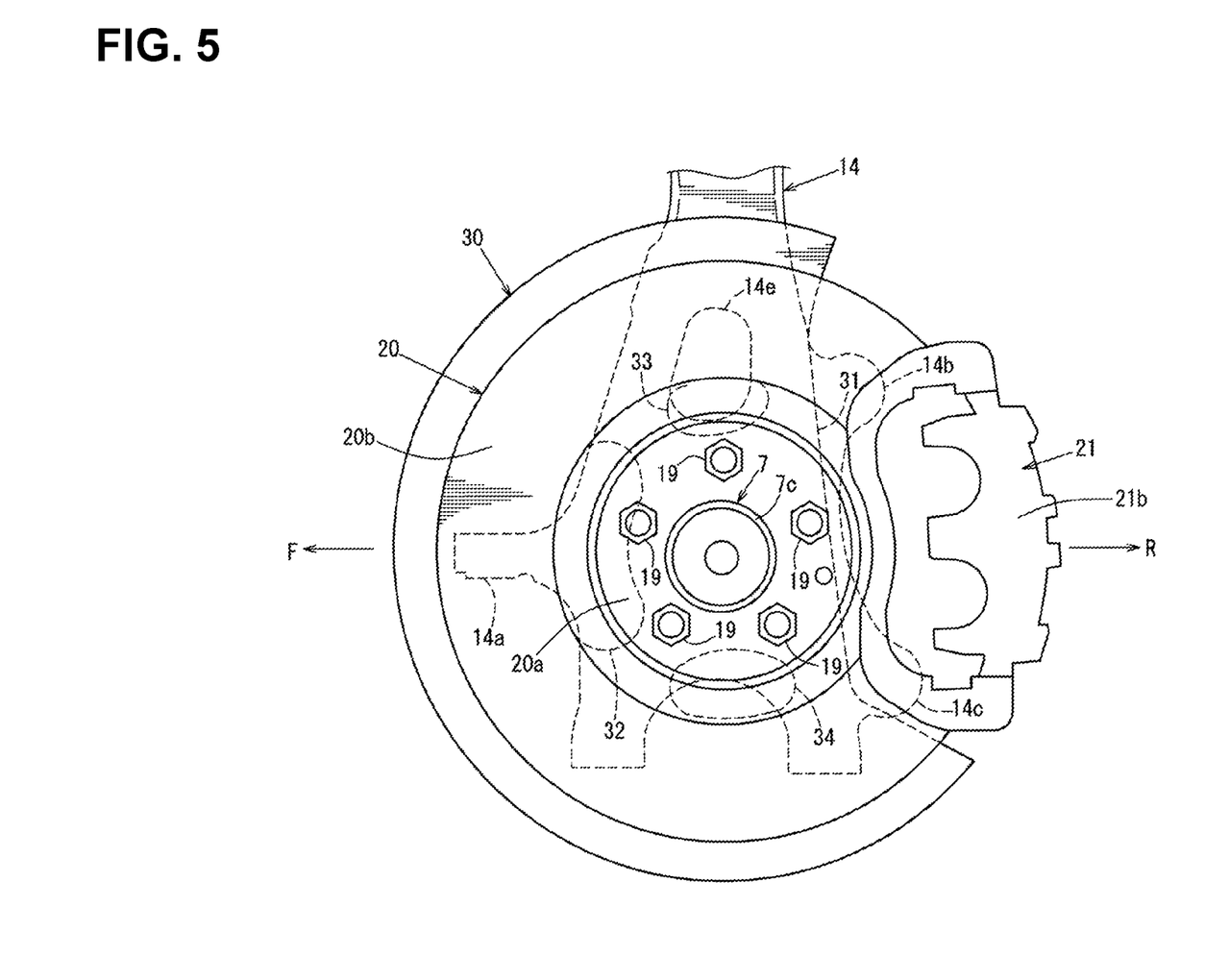
FIG. 5 is an outer side view of the vehicle brake as viewed from a vehicle-width-direction outer side.
Figure 6:
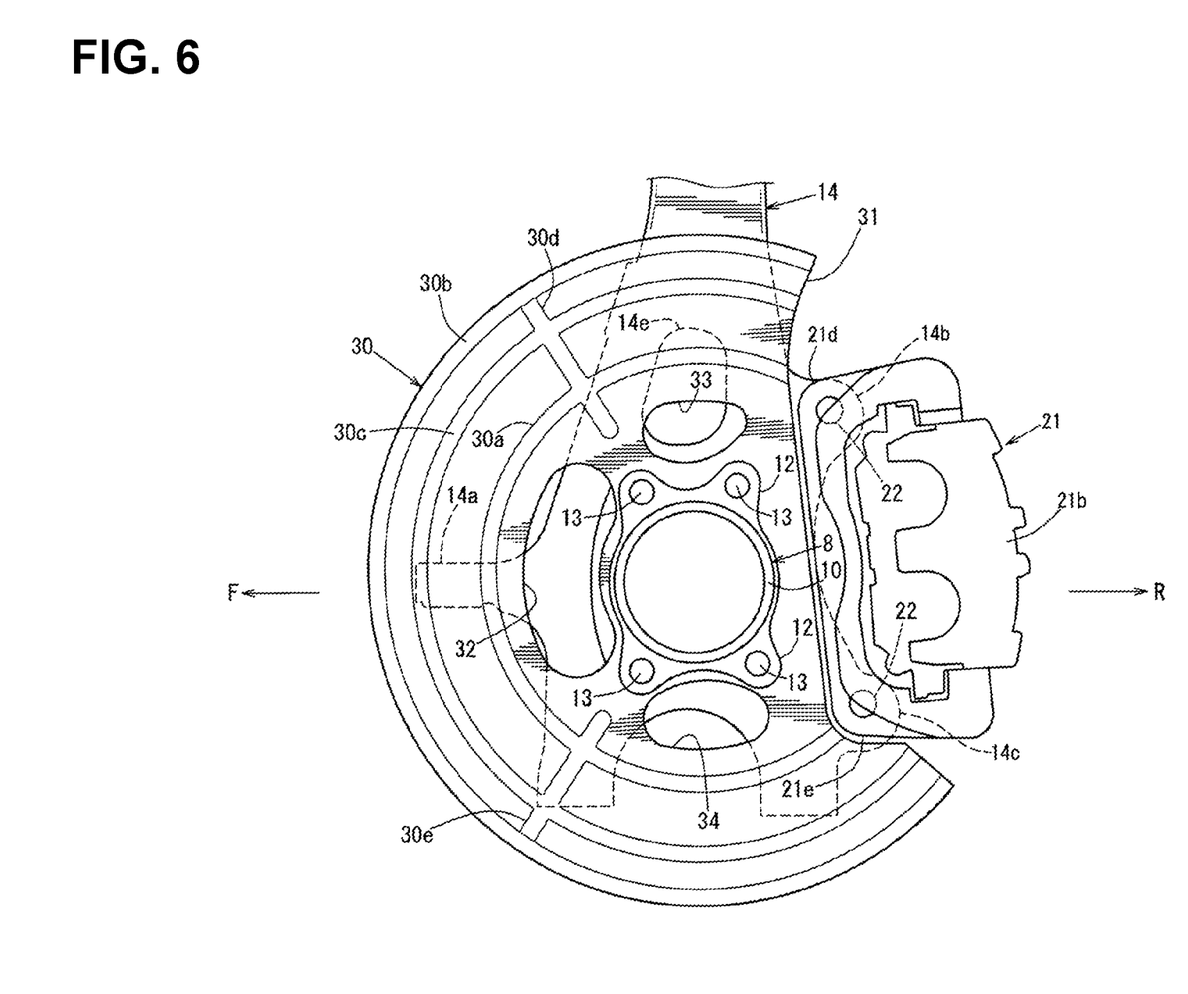
FIG. 6 is an outer side view with the disk rotor and a hub removed.

An example of this disclosure will be detailed below with reference to the drawings. The drawings illustrate a disk rotor of a vehicle brake, wherein FIG. 1 is a schematic plan view showing a structure of a left front portion of a vehicle including the vehicle brake, FIG. 2 is a sectional view of a wheel assembly including the vehicle brake, and FIG. 3 is an enlarged sectional view of major parts in FIG. 2. FIG. 4 is an inner side view of the wheel assembly as viewed from a vehicle-width-direction inner side, FIG. 5 is an outer side view of the vehicle brake as viewed from a vehicle-width-direction outer side, and FIG. 6 is an outer side view with the disk rotor and a hub removed.

While the disk rotor of the vehicle brake of the present disclosure may be used in any of left and right front wheels and left and right rear wheels, examples given below describe a structure in which the disk rotor is used in a left front wheel of a vehicle. In FIG. 1, a front fender panel 2 is formed continuously from an outer rear end in a vehicle width direction of a front bumper face 1, and a wheel well 3 is provided on a vehicle-width-direction inner side of the front fender panel 2.

A wheel assembly 4 is disposed in the wheel well 3. As shown in FIG. 2 which gives an enlarged view, the wheel assembly 4 includes a wheel 5 (more specifically a disk wheel) composed of a disk portion 5D and a rim portion 5R integrally formed around an outer periphery of the disk portion 5D, and a tire 6 held by the rim portion 5R of the wheel 5.

As shown in FIGS. 2 and 3, a hub 7 is provided on the vehicle-width-direction inner side of a center of the disk portion 5D of the wheel 5. The hub 7 is integrally formed of a cylindrical shaft portion 7a, a flange portion 7b integrally formed from a portion of the shaft portion 7a near its vehicle-width-direction outer side, and a cylindrical large-diameter shaft portion 7c positioned on the vehicle-width-direction outer side of the flange portion 7b and having a larger diameter than that of the shaft portion 7a.

As shown in FIG. 3, a wheel bearing 8 (more specifically a double-row angular ball bearing with an outer ring flange) is disposed around an outer periphery of the shaft portion 7a of the hub 7. Here, the angular ball bearing refers to an angular contact bearing, and the bearing 8 is an oblique contact ball bearing used for a portion that rotates under loads in both axial and radial directions.

As shown in FIG. 3, the wheel bearing 8 includes an inner lace 9 as a rotating element, an outer lace 10 as a fixing element, and multiple balls 11 interposed between the inner lace 9 and the outer lace 10. As shown in FIG. 6, a flange portion 12 extending in an up-down direction is integrally formed from an outer portion of the outer lace 10.

As shown in FIGS. 4 and 6, a hub carrier 14 is connected to the flange portion 12 of the outer lace 10 of the wheel bearing 8 with multiple fastening members 13. As shown in FIGS. 3 and 4, the hub carrier 14 includes a tie rod connecting portion 14a extending to a vehicle front side from a position corresponding to a center in the up-down direction of the hub 7, and upper and lower caliper connecting portions 14b, 14c bulging out to a vehicle rear side from positions respectively upwardly and downwardly spaced apart from the center of the hub 7.

As shown in FIG. 3, the hub carrier 14 further includes an opening 14d formed at a position corresponding to the hub 7, and as shown in FIG. 4, includes an opening 14e formed above the opening 14d to reduce weight.

As shown in FIG. 3, a tie rod 16 is connected to the tie rod connecting portion 14a of the hub carrier 14 via a tie rod end 15. Also, an upper portion of the hub carrier 14 shown in FIG. 4 is connected to an upper arm (not shown) that constitutes a front suspension apparatus. As shown in FIGS. 2 and 3, a disk rotor 20 (synonymous with a brake rotor) made of cast iron is fastened and fixed between the center of the disk portion 5D of the wheel 5 and the flange portion 7b of the hub 7 using multiple fastening members 19 shown in FIG. 5.

In other words, all of the disk portion 5D of the wheel 5, the flange portion 7b of the hub 7, and the disk rotor 20 are co-fastened and fixed by the fastening members 19 shown in FIG. 5. More specifically, each of the fastening members 19 is composed of a bolt and a nut, and the bolt is mounted upright on the flange portion 7b of the hub 7 and extended to the vehicle-width-direction outer side. The bolt is protruded outward through a hat portion 20a of the disk rotor 20 and a corresponding bolt insertion hole (not shown) of the disk portion 5D of the wheel 5, and the nut is fastened to this protrusion of the bolt from a vehicle outer side.

As shown in FIGS. 2 and 3, the disk rotor 20 includes the hat portion 20a positioned at a center of the disk rotor 20 and having a closed-end cylindrical shape, an outer sliding face 20b positioned on an outer periphery side of the hat portion 20a and having a ring shape, and an inner sliding face 20c positioned on the vehicle-width-direction inner side of the outer sliding face 20b.

The hat portion 20a, the outer sliding face 20b, and the inner sliding face 20c are integrally formed by sand casting. Both of the outer sliding face 20b and the inner sliding face 20c constitute a ventilated disk.

As shown in FIGS. 2, 4, and 5, the disk rotor 20 is disposed with a saddle-shaped caliper 21 on the rear side of the disk rotor 20 relative to a hub center thereof (the center in the radial direction of the hub 7). As shown in FIG. 2, the caliper 21 includes an inner portion 21a positioned on the vehicle-width-direction inner side, an outer portion 21b positioned on the vehicle-width-direction outer side, and a connecting portion 21c connecting these portions 21a, 21b in the vehicle width direction. The caliper 21 pinches the disk rotor 20 with brake pads 23, 24 (described later) during braking.

As shown in FIG. 6, the inner portion 21a of the caliper 21 is integrally formed with, at its upper and lower portions, protrusions 21d, 21e protruding to the vehicle front side so as to respectively correspond to the caliper connecting portions 14b, 14c of the hub carrier 14.

As shown in FIGS. 4 and 6, the caliper connecting portions 14b, 14c of the hub carrier 14 are respectively connected to the protrusions 21d, 21e of the caliper 21 each with a fastening member 22 to thereby fix the caliper 21 to the hub carrier 14.

Also, as shown in FIG. 2, an inner brake pad 23 is disposed between the inner portion 21a of the caliper 21 and the inner sliding face 20c of the disk rotor 20. Likewise, an outer brake pad 24 is disposed between the outer portion 21b of the caliper 21 and the outer sliding face 20b of the disk rotor 20. These brake pads 23, 24 are frictional members for braking that pinch the disk rotor 20 from both sides during braking and are made of a non-steel non-asbestos friction material.

As shown in FIGS. 2 and 3, a dust cover 30 having a larger diameter than the outer diameter of the disk rotor 20 is attached at the inner face side in the vehicle width direction of the disk rotor 20. The dust cover 30 is formed in a plate shape and disposed spaced apart from the disk rotor 20 and adjacent to the inner side in the vehicle width direction of the disk rotor 20.

As shown in FIGS. 4 and 6, by means of the fastening members 13 here too, the dust cover 30 is fastened and fixed at its center to the flange portion 12 of the wheel bearing 8. The dust cover 30 is made of a sheet metal member and is a cover member that protects the disk rotor 20 against rust.

As shown in FIG. 6, the dust cover 30 is formed at its rear portion with a cutout portion 31 that is formed by cutting out a portion of the dust cover 30 rearward of the hub center (the center in the radial direction of the hub 7) in the up-down direction by the length required for attaching the caliper 21. The caliper 21 is disposed within the cutout portion 31. In other words, the cutout portion 31 prevents interference between the dust cover 30 and the caliper 21.

As shown in FIG. 6, the dust cover 30 is also formed with a front opening 32, an upper opening 33, and a lower opening 34 respectively at its front, upper and lower portions corresponding to the outside of the flange portion 12 of the wheel bearing 8.

These openings 32, 33, and 34 are openings for cooling the disk rotor 20 by taking in traveling air to the inner peripheral surface of the disk rotor 20, more specifically, between the inner sliding face 20c and the outer sliding face 20b. As shown in FIG. 6, the opening area of the front opening 32 is largest among opening areas of the front opening 32, the upper opening 33, and the lower opening 34, relative to opening areas of other openings 33, 34.

As shown in FIG. 6, the dust cover 30 is also integrally formed with a bead 30a positioned on the inner periphery side and extending continuously in the circumferential direction, a bead 30b positioned on the outer periphery side and extending continuously in the circumferential direction, and an intermediate bead 30c positioned between these beads 30a, 30b and continuous in the circumferential direction.

As shown in FIG. 6, the dust cover 30 is also integrally formed with multiple radial beads 30d, 30e connecting the above beads 30b, 30c, and 30a in the radial direction and extending in the radial direction further inward than the bead 30a on the inner periphery side. In this example, an opening angle between the two radial beads 30d, 30e is set at 110 to 120 degrees, though the number of the beads 30a, 30b, 30c, 30d, and 30e and the opening angle between the beads 30d, 30e are not limited to those given above.

The beads 30a, 30b, 30c, 30d, and 30e helps increase rigidity of the dust cover 30. It should be noted that for convenience of illustration, the beads 30a, 30b, 30c, 30d, and 30e have been omitted in FIGS. 4 and 5.

As shown in FIG. 3, an outer peripheral edge of the dust cover 30 is close to, but not in contact with, an inner peripheral surface of the rim portion 5R of the wheel 5, forming a clearance CL between the outer peripheral edge of the dust cover 30 and the inner peripheral surface of the rim portion 5R.

The clearance CL is set in the range from 8 to 15 mm That is, the following are the results of computational fluid dynamics (CED) analysis carried out under conditions in which the clearance CL between the dust cover 30 and the rim portion 5R of the wheel 5 is 22 mm, 10 mm, and 0 mm.

Taking the ratio of the heat transfer coefficient h when the CL=22 mm as 100%, the ratio when the CL=10 mm was 103%, and the ratio when the CL=0 mm was 110%.

That is, reducing the clearance CL from 22 mm to 10 mm results in a 3% improvement in the heat transfer coefficient, and reducing the clearance CL from 22 mm to 0 mm results in a 10% improvement in the heat transfer coefficient.

The upper limit of the clearance CL is set to 15 mm or less for good performance of the heat transfer coefficient h. The lower limit of the clearance CL is set to 8 mm taking into account productivity. If the clearance CL is less than 8 mm, the outer peripheral edge of the dust cover 30 may interfere with the rim portion 5R due to production variation. Accordingly, the clearance CL is set in the range from 8 to 15 mm.

Bringing the outer peripheral edge of the dust cover 30 close to the inner peripheral surface of the rim portion 5R of the wheel 5 as shown in FIG. 3 allows restraining the traveling air from flowing past the inner periphery of the rim portion 5R from the vehicle-width-direction inner side to the vehicle-width-direction outer side of the dust cover 30. This leads to forming a positive pressure area α on the vehicle-width-direction inner side of the dust cover 30 and forming a negative pressure area β on the vehicle-width-direction outer side of the dust cover 30 and near the outer peripheral edge of the disk rotor 20, as shown in FIG. 3.

As the openings 32, 33, and 34 are provided in the dust cover 30 positioned on the inner face side of the disk rotor 20 in the vehicle width direction, the openings 32, 33, and 34 can be positioned in the positive pressure area α and the outer peripheral portion of the disk rotor 20 can be positioned in the negative pressure area β.

Pressure difference between the above positive pressure and negative pressure improves the airflow velocity, which helps improve efficiency in cooling the disk rotor 20. Specifically, traveling air having entered the vehicle-width-direction inner side of the dust cover 30 inside the wheel 5 through a portion below the bumper from the vehicle front side then enters in between the inner sliding face 20c and the outer sliding face 20b from the openings 32, 33, and 34 of the dust cover 30 as shown by arrows in FIG. 3 (however, only the front opening 32 is shown in FIG. 3).

As shown by the arrows in FIG. 3, the traveling air having entered in between the sliding faces 20c, 20b has its airflow velocity improved by the synergy effect of the pressure difference between the positive pressure and the negative pressure and a centrifugal force by rotation of the disk rotor 20, and, after going out through the outer peripheral edge between the sliding faces 20c, 20b, the traveling air is sucked out of the wheel 5 by a high-velocity airflow flowing along a vehicle body side face.

In FIGS. 2 and 3, a cover member 35 is a cover member for closing the opening 14d of the hub carrier 14, and a cap member 36 is a cap member for closing a center opening of the disk portion 5D of the wheel 5. In FIG. 3, a lower arm 37 is a lower arm as a suspension arm forming a part of a suspension apparatus that suspends the wheel assembly 4.

Figure 7:
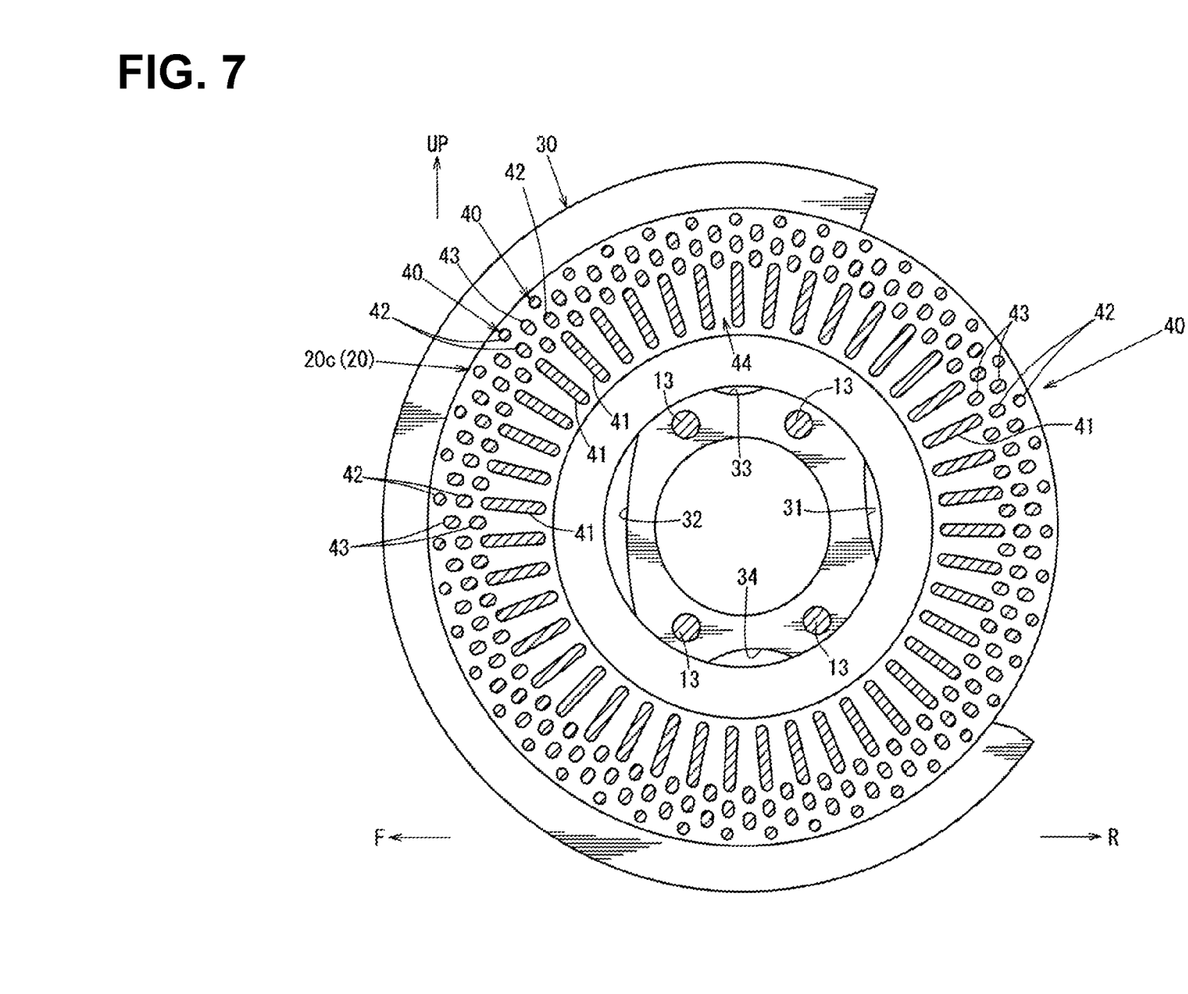
FIG. 7 is a sectional view of major parts along the line X-X in FIG. 1.
Figure 8:
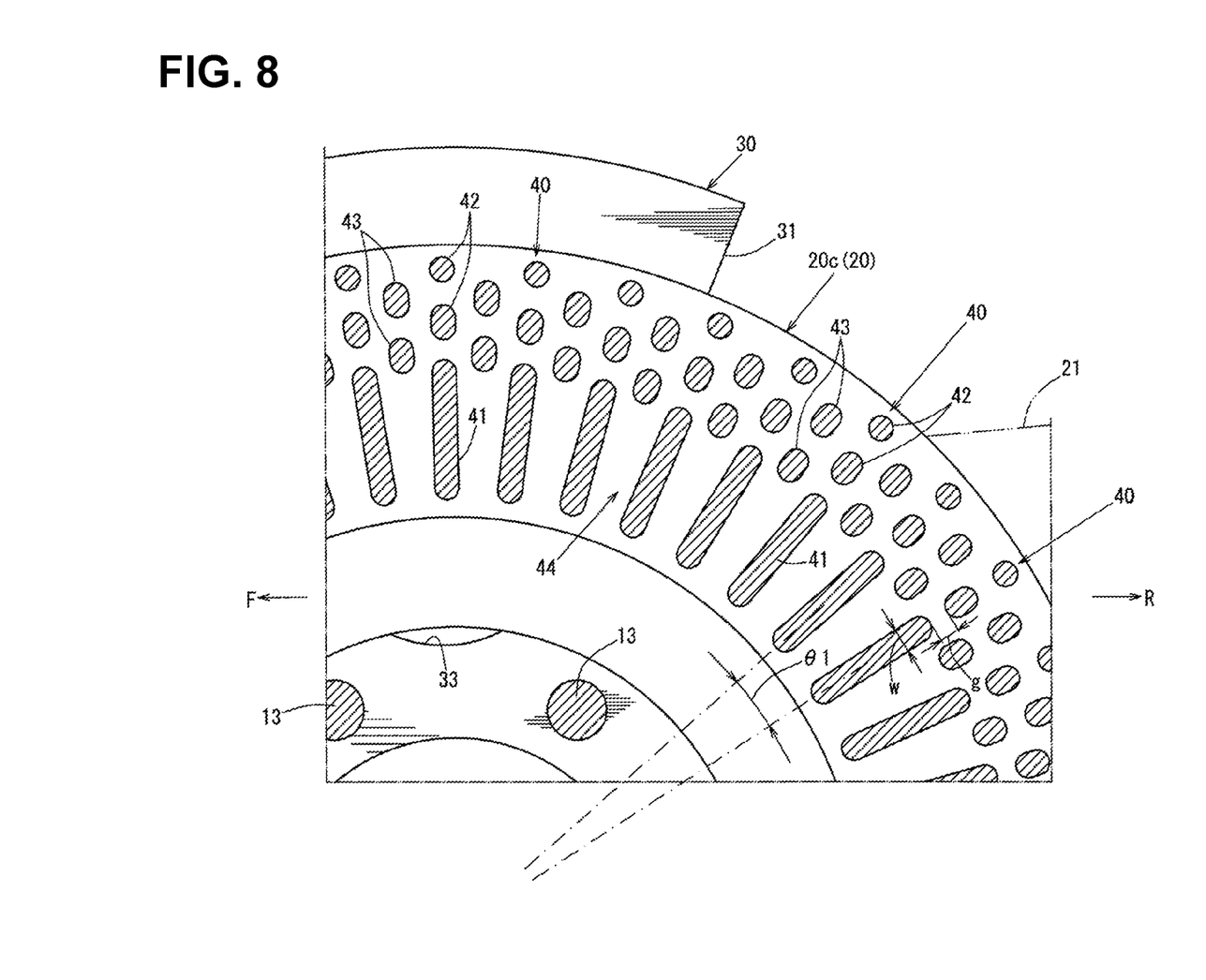
FIG. 8 is a partially enlarged view of FIG. 7.

FIG. 7 is a sectional view of major parts along the line X-X in FIG. 1. FIG. 8 is a partially enlarged view of FIG. 7. As shown in FIGS. 7 and 8, between the outer sliding face 20b and the inner sliding face 20c defining the inside of the disk rotor 20, multiple cooling fins 40 radially extending from a region proximal the inner peripheral edge to a region proximal the outer peripheral edge of the disk rotor 20 are provided at equal intervals in the circumferential direction.

In the example (Example 1) shown in FIGS. 7 and 8, an opening angle θ1 (see FIG. 8) between circumferentially adjacent cooling fins 40, 40 is set to 8.4 degrees (more precisely, 360°/43) and a total of forty-three cooling fins 40 are formed. The cooling fins 40 connect the outer sliding face 20b and the inner sliding face 20c of the disk rotor 20 in the vehicle width direction.

Each of the multiple cooling fins 40 includes a radial fin 41 that extends radially and multiple (two in this example) second fins 42, 42 for generating turbulent flow that are spaced apart from the radial fin 41 by a gap g in the radial direction.

As shown in FIG. 8, in this example, a width W in the circumferential direction of each of the radial fin 41 and the second fins 42 is set to 4.8 mm. The gap g between an outer radial edge of the radial fin 41 and an inner radial edge of the second fin 42 is set to 6.0 mm. Likewise, a gap between the second fins 42, 42 in the radial direction is set to 6.0 mm. While the gap g is required to be 6.0 mm or more due to strength of a sand core used for casting the disk rotor 20, namely, due to manufacturing limits, the width W in the circumferential direction of each of the radial fin 41 and the second fins 42 is not limited to 4.8 mm. Also, the opening angle θ1 between the cooling fins 40, 40 is not limited to 8.4 degrees as long as both of the sand core strength and pumping performance can be ensured.

Splitting each cooling fin 40 into the radial fin 41 and the second fins 42 in this manner helps more efficiently cool the disk rotor 20 by the synergy effect that comes from ensuring the velocity of airflow flowing between the circumferentially adjacent cooling fins 40, 40, ensuring fin surface areas, and generating turbulent flow by the second fins 42.

In particular, turbulent flow is generated by the second fins 42. The heat transfer coefficient of this turbulent flow is significantly larger than that of laminar flow, thereby helping improve efficiency in cooling the disk rotor 20.

As shown in FIG. 8, the radial fin 41 is composed of an oval fin having an oval shape, and each of the second fins 42 is formed with a shorter length than that of the oval fin (radial fin 41) in the radial direction of the disk rotor 20. As shown in FIG. 8, the oval fin (radial fin 41) is positioned on the inner periphery side of the disk rotor 20, and the second fins 42 are positioned on the outer periphery side of the disk rotor 20.

Positioning the oval fin (radial fin 41) on the inner periphery side in this manner helps improve airflow velocity by virtue of mutual pumping performance by circumferentially adjacent oval fins (radial fins 41, 41), and this airflow with improved velocity brings about turbulent flow at the second fins 42.

Additionally, as shown in FIG. 8, the oval fin (radial fin 41) is provided over a half or more of the length of the disk rotor 20 in the radial direction thereof. More specifically, the oval fin (radial fin 41) is provided between the outer sliding face 20b and the inner sliding face 20c over a half or more of the length of the outer sliding face 20b and the inner sliding face 20c in the radial direction thereof. Also, the multiple (two in this example) second fins 42 having a perfect or approximately perfect circular shape are provided in a direction extending from the oval fin (radial fin 41) (radially outward of the oval fin). In this example, of the two second fins 42, 42 arranged in the radial direction, one on the inner periphery side is formed in an approximately perfect circular shape, and the other on the outer periphery side is formed in a perfect circular shape.

Making the oval fin (radial fin 41) as long as, or longer than, a half of the disk rotor 20 in the radial direction thereof in this manner ensures sufficient pumping performance, which in turn allows obtaining sufficient airflow velocity. This helps further improves efficiency in cooling the disk rotor 20 by the synergy effect that comes from ensuring this airflow velocity, ensuring the surface area by the oval fin (radial fin 41) and the second fins 42, and generating turbulent flow by the multiple second fins 42.

In this example, as shown in FIG. 8, the length of the oval fin (radial fin 41) is set to 52 to 56% of the radial length of the disk rotor 20. Pumping performance is ensured by this oval fin (radial fin 41), thereby helping improve the airflow velocity. Specifically, as the heat transfer coefficient h is proportional to the airflow velocity $U_T$ ($h \propto U_T$), improving the airflow velocity $U_T$ helps improve the heat transfer coefficient h. It should be noted that the ratio of the length (52 to 56%) of the oval fin (radial fin 41) is not limited to the above value.

Additionally, as shown in FIG. 8, between circumferentially adjacent cooling fins 40, 40, third fins 43 are provided respectively between the oval fin (radial fin 41) and the second fin 42 and between the multiple second fins 42, 42. A total of outer peripheral areas of the oval fin (radial fin 41), the second fins 42, 42, and the third fins 43 are made larger than an outer peripheral area of a cooling fin when it is formed of a single radial fin alone.

Providing the third fins 43 compensates for decrease in brake surface pressure during braking at the gaps between the radially extending oval fin (radial fin 41) and the second fin 42 and between the inner and outer second fins 42, 42. Additionally, increasing the outer peripheral surface areas helps further improve the efficiency in cooling the disk rotor 20. Additionally, turbulent flow is also generated by the third fins 43, thereby helping further improve the heat transfer coefficient.

As shown in FIG. 8, as viewed in the circumferential direction, inner and outer radial edges of the third fin 43 radially overlap radial edges of the oval fin (radial fin 41) and the second fin 42 adjacent to each other in the radial direction. Thus, the fins 41, 42, and 43 are continuously present in the radial direction of the disk rotor 20, thereby helping further stabilize the brake surface pressure during braking.

As shown in FIG. 8, at portions where the fins 41, 42, and 43 are absent between opposing faces of the outer sliding face 20b and the inner sliding face 20c of the disk rotor 20, a ventilation hole 44 (so-called inner channel) is formed to permit the traveling air to flow from the inner periphery to the outer periphery.

In short, as shown in FIG. 8, the multiple oval fins (radial fins 41) each being as long as, or longer than, a half of the disk rotor 20 in the radial direction thereof helps improve, by their pumping function, the velocity of the traveling air flowing from an inner edge of the ventilation hole 44 toward the outer periphery. Additionally, the traveling air having its velocity improved hits the multiple second fins 42, 42 and third fins 43, 43 to thereby bring about turbulent flow, which helps improve heat exchange function.

Figure 9:
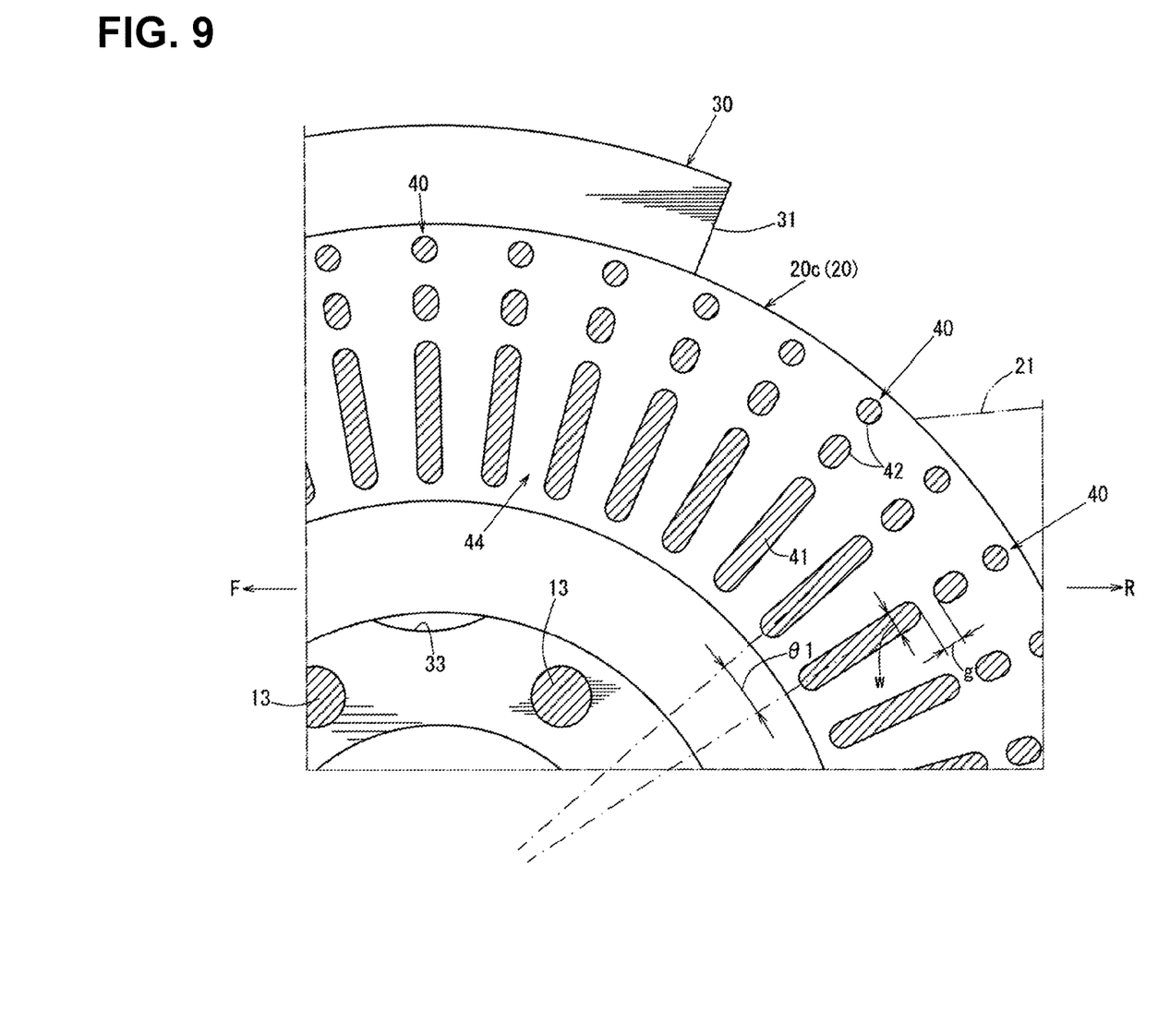
FIG. 9 is a partially enlarged view of Example 2.
Figure 10:
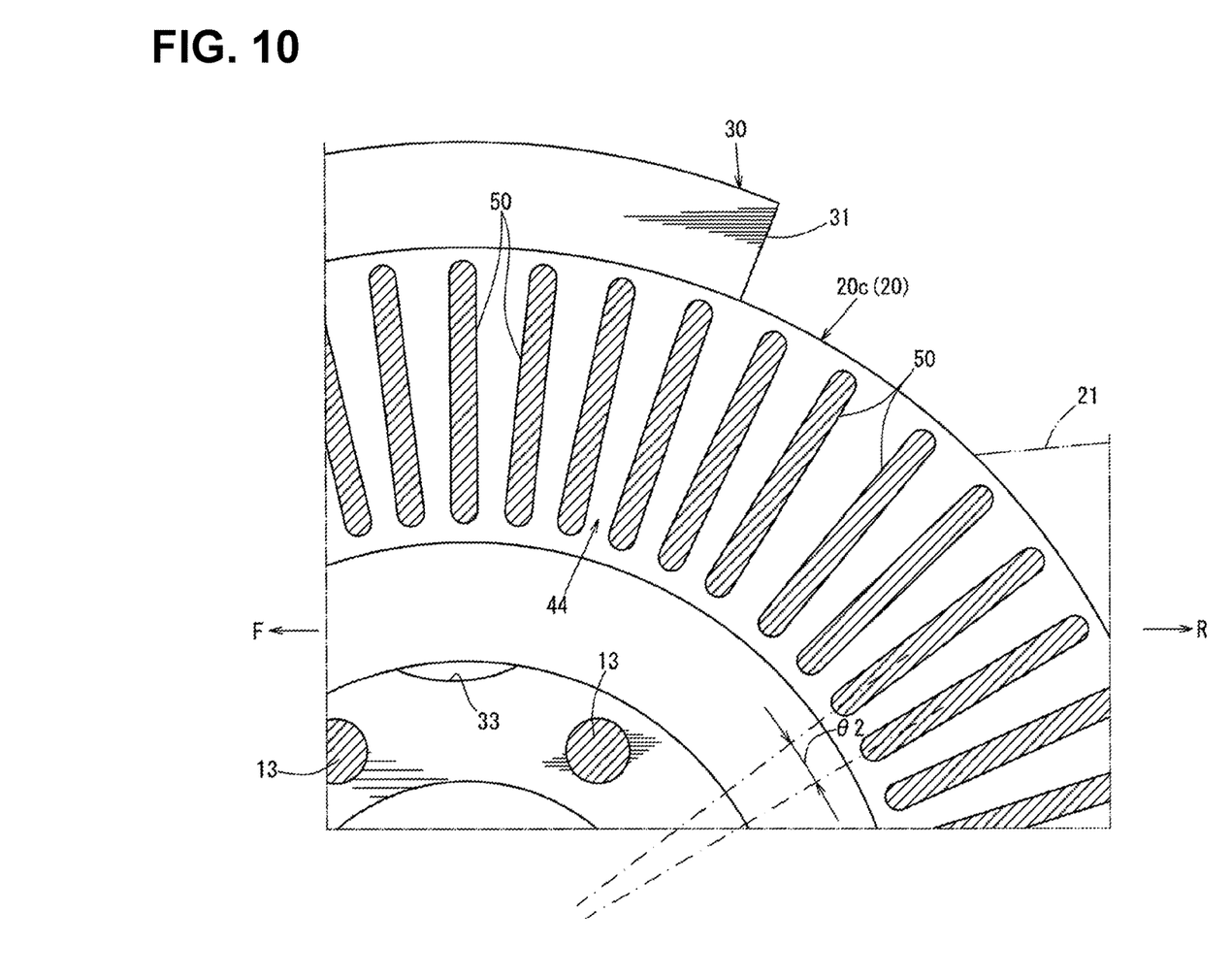
FIG. 10 is a partially enlarged view showing a comparative example.
Figure 11:
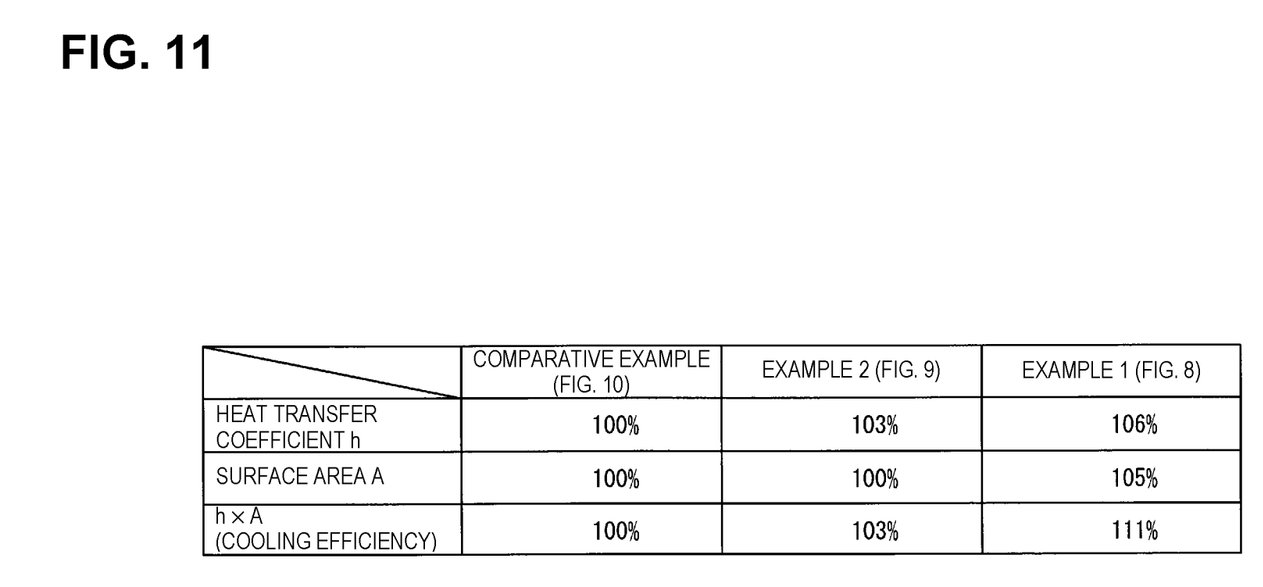
FIG. 11 is an explanatory diagram showing ratios of heat transfer coefficient, surface area, and cooling efficiency of each example with values of the comparative example being defined as 100%.

FIG. 9 is a partially enlarged view of Example 2. FIG. 10 is a partially enlarged view of a comparative example. FIG. 11 is an explanatory diagram showing differences in the heat transfer coefficient h, the surface area A, and the cooling efficiency h×A between the comparative example, Example 1, and Example 2, by showing ratios of the heat transfer coefficient h, the surface area A, and the cooling efficiency h×A of Examples 1 and 2 as expressed in percentage with values of the comparative example being defined as 100%.

The example shown in FIGS. 7 and 8 is Example 1, and the disk rotor of Example 2 shown in FIG. 9 and the disk rotor of the comparative example shown in FIG. 10 were configured so as to differentiate from this Example 1 in terms of the heat transfer coefficient h, the surface area A, and the cooling efficiency h×A.

The disk rotor of the vehicle brake of Example 2 shown in FIG. 9 is devoid of all the third fins 43 which are included in the configuration of Example 1 shown in FIGS. 7 and 8. The disk rotor of the vehicle brake of the comparative example shown in FIG. 10 is provided with, in place of the fins 41, 42, and 43 of Example 1 shown in FIGS. 7 and 8, multiple cooling fins 50 arranged at equal intervals in the circumferential direction and each radially and linearly extending continuously from the inner peripheral edge to the outer peripheral edge between the inner sliding face 20c and the outer sliding face 20b of the disk rotor 20.

In the comparative example, an opening angle θ2 between circumferentially adjacent cooling fins 50, 50 is made smaller than the opening angle θ1 in Examples 1 and 2. That is, a relational expression of θ2<θ1 holds. In FIGS. 9 and 10, similar components to those in FIG. 8 are denoted by the same respective reference numerals.

FIG. 11 shows analysis results of simulations carried out under the same conditions by mounting each disk rotor 20 of Example 1 shown in FIG. 8, Example 2 shown in FIG. 9, and the comparative example shown in FIG. 10 to the wheel assembly 4 (see FIG. 1). The heat transfer coefficient h is proportional to the Nusselt number. That is, the following relational expression of Expression 1 holds.

$$h \propto Nu \qquad \text{[Expression 1]}$$

Herein, Nu denotes the Nusselt number, which is a dimensionless number (a quantity whose value is independent of units) representing the magnitude of the heat transfer coefficient h. Specifically, the Nusselt number Nu is a dimensionless number given by the ratio of heat capacity transferred by heat convection during flow of a fluid to heat capacity considered to be transferred by heat conduction alone while the fluid is stationary.

The Nusselt number Nu becomes larger when the traveling air flowing through the ventilation hole 44 is turbulent flow than when it is laminar flow. In other words, the magnitude of the heat transfer coefficient h depends on whether the traveling air is laminar flow or turbulent flow, and the heat transfer coefficient h has a larger value when the traveling air is turbulent flow. The Nusselt number Nu when the traveling air is laminar flow can be expressed by the following Expression 2, and the Nusselt number Nu when the traveling air is turbulent flow can be expressed by the following Expression 3.

$$Nu = 0.664 Re^{\frac{1}{2}} Pr^{\frac{1}{3}} \qquad \text{[Expression 2]}$$

$$Nu = 0.037 Re^{\frac{4}{5}} Pr^{\frac{1}{3}} \qquad \text{[Expression 3]}$$

Herein, Re denotes the Reynolds number, and Pr denotes the Prandtl number. Specifically, the Reynolds number Re is a dimensionless number representing a ratio of viscous forces to inertial forces of flow; at lower Reynolds number Re than a certain value, laminar flow takes place that flows smoothly, and at higher Reynolds number Re than a certain value, turbulent flow takes place that contains irregular fluctuating components in its speed and pressure.

The Prandtl number Pr is the ratio of momentum energy diffusion rate to thermal energy diffusion rate. That is, the Prandtl number Pr is a dimensionless number defined by the ratio of kinematic viscosity coefficient, which is a momentum diffusion coefficient, to thermal diffusion coefficient. The Prandtl number Pr is a physical property value intrinsic to fluids, and the Prandtl number Pr of air is 0.7. Further, a radiation amount Q representing an effect of an improvement in cooling can be expressed by the following Expression 4.

$$Q = h \times A \times \Delta T \qquad \text{[Expression 4]}$$

Herein, h denotes the heat transfer coefficient, A denotes the surface area (the total of outer peripheral surface areas of all fins), and ΔT denotes a difference between temperature of the disk rotor 20 and atmospheric temperature (i.e., outside temperature).

The fin structure of the comparative example shown in FIG. 10 generates little turbulent flow and makes the traveling air flowing through the ventilation hole 44 laminar Herein, this heat transfer coefficient h is defined as 100%. In contrast, the fin structure of Example 2 shown in FIG. 9 generated turbulent flow by the two second fins 42, 42 for generating turbulent flow, thereby improving the heat transfer coefficient h to about 103%.

In addition to the second fins 42, 42, the fin structure of Example 1 shown in FIG. 8 further includes the two third fins 43, 43, which also generated turbulent flow, thereby further improving the heat transfer coefficient h to about 106%. Put simply, as compared to the heat transfer coefficient h of the comparative example as a baseline, Example 2 saw a 3% improvement, and Example 1 saw a 6% improvement.

In regard to the surface area A, which affected the radiation amount Q, when the surface area A of the comparative example was defined as 100%, Example 2 had a similar surface area. That is, in Example 2, while the surface areas of the fins 41, 42 decreased as a function of the width W and the gaps between the fins 41, 42 and between the fins 42, 42, surfaces areas of both inner and outer faces of ventilating portions in the vehicle width direction corresponding to the gaps between the fins 41, 42 and between the fins 42, 42 increased, resulting in a similar surface area to that of the comparative example. The fin structure of Example 1 shown in FIG. 8 had an increase in the total surface area A to about 105% by virtue of the two third fins 43, 43. Put simply, as compared to the surface area A of the comparative example as a baseline, Example 2 had a similar surface area to the surface area A of the comparative example, and Example 1 saw an increase in the surface area by 5%.

In regard to the cooling efficiency expressed by the product of the heat transfer coefficient h and the surface area A (h×A), when the cooling efficiency of the comparative example shown in FIG. 10 was defined as 100%, the cooling efficiency of Example 2 shown in FIG. 9 improved to about 103%, and the cooling efficiency of Example 1 shown in FIG. 8 further improved to about 111%. Put simply, as compared to the cooling efficiency h×A of the comparative example shown in FIG. 10 as a baseline, Example 2 shown in FIG. 9 saw a 3% improvement, and Example 1 shown in FIG. 8 saw an 11% improvement.

As described above, the disk rotor of the vehicle brake of the above examples includes multiple cooling fins 40 provided inside the disk rotor 20 (more specifically, between the outer sliding face 20b and the inner sliding face 20c) at intervals in the circumferential direction and extending radially from the inner peripheral edge to the outer peripheral edge of the disk rotor 20, and each of the multiple cooling fins 40 includes a radial fin 41 extending radially, and the second fins 42 spaced apart from the radial fin 41 by the gap g in the radial direction (see FIGS. 7, 8, and 9).

With this configuration, each cooling fin 40 is split into the radial fin 41 and the second fins 42, and this helps more efficiently cool the disk rotor 20 by the synergy effect that comes from ensuring the velocity of airflow flowing between the circumferentially adjacent cooling fins 40, 40, ensuring fin surface areas, and generating turbulent flow by the second fins 42. In particular, turbulent flow can be generated by the second fins 42. The heat transfer coefficient h of this turbulent flow (see FIG. 11) is significantly larger than that of laminar flow, thereby helping improve efficiency (see h×A in FIG. 11) in cooling the disk rotor 20.

In one embodiment of this disclosure, the radial fin 41 is composed of an oval fin having an oval shape, and each of the second fins 42 is formed with a shorter length than that of the oval fin (radial fin 41) in the radial direction of the disk rotor 20. The oval fin (radial fin 41) is positioned on the inner periphery side of the disk rotor 20, and the second fins 42 are positioned on the outer periphery side of the disk rotor 20 (see FIGS. 8 and 9).

With this configuration, pumping performance by the oval fins (radial fins 41) positioned on the inner periphery side of the disk rotor 20 (more specifically, on the inner periphery side between the outer sliding face 20b and the inner sliding face 20c) helps improve the airflow velocity, and this airflow with improved velocity can bring about turbulent flow at the second fins 42.

In one embodiment of this disclosure, the oval fin (radial fin 41) is provided over a half or more of the length of the disk rotor 20 in the radial direction thereof, and the multiple second fins 42 having a perfect or approximately perfect circular shape are provided in a direction extending from the oval fin (radial fin 41) (see FIGS. 8 and 9).

With this configuration, the oval fin (radial fin 41) is made as long as, or longer than, a half of the disk rotor 20 in the radial direction thereof (more specifically, in the radial direction of the sliding faces 20b, 20c), and this allows obtaining sufficient pumping performance, thereby helping ensure sufficient airflow velocity.

This helps further improve the efficiency in cooling the disk rotor 20 (see h×A in FIG. 11) by the synergy effect that comes from ensuring this airflow velocity, ensuring the surface area A (see FIG. 11) by the oval fin (radial fin 41) and the second fins 42, and generating turbulent flow by the multiple second fins 42.

Additionally, in one embodiment of this disclosure, between circumferentially adjacent cooling fins 40, 40, the third fin 43 is provided at least one of between the oval fin (radial fin 41) and the second fin 42 and between the multiple second fins 42, 42, and a total of outer peripheral areas of the oval fin (radial fin 41), the second fins 42, 42, and the third fin 43 are made larger than an outer peripheral area of a cooling fin when it is formed of a single radial fin alone (see FIG. 8).

With this configuration, the third fin 43 can compensate for decrease in brake surface pressure at the gap between the radially extending oval fin (radial fin 41) and the second fin 42 or between the second fins 42, 42. Also, increase in the outer peripheral surface area (see the surface area A in FIG. 11) helps further improve the efficiency in cooling the disk rotor 20 (see h×A in FIG. 11). Further, turbulent flow can be also generated by the third fin 43, thereby helping further improve the heat transfer coefficient h.

Additionally, in one embodiment of this disclosure, as viewed in the circumferential direction, inner and outer edges of the third fin 43 radially overlap edges of the oval fin (radial fin 41) and the second fin 42 adjacent to each other in the radial direction (see FIG. 8). With this configuration, the fins 41, 42, and 43 are continuously present in the radial direction of the disk rotor 20, thereby helping further stabilize the brake surface pressure.

As regards correspondence between the configuration of this disclosure and the above examples, the inside of the disk rotor 20 of this disclosure corresponds to the portion between the outer sliding face 20b and the inner sliding face 20c in the examples, and likewise, the oval fin corresponds to the radial fin 41. However, this disclosure is not limited only to the configuration of the above examples.

For example, while in the above examples the fins 41, 42, and 42 are arranged linearly in the radial direction, instead of this structure, the fins 41, 42, and 42 may be arranged along a virtual curved line that extends radially in a curved manner from the inner to outer peripheral edges of the disk rotor 20.

As described above, the present disclosure is useful for a disk rotor of a vehicle brake including multiple cooling fins provided inside the disk rotor at intervals in the circumferential direction and each extending radially from inner to outer peripheral edges of the disk rotor.

What is claimed is:

1. A disk rotor of a vehicle brake comprising:
a plurality of cooling fins provided inside the disk rotor at intervals in a circumferential direction, each extending radially from a region proximal an inner peripheral edge of the disk rotor to a region proximal an outer peripheral edge of the disk rotor, wherein
each of the plurality of cooling fins includes a radial fin extending radially and a plurality of second fins extending radially, spaced apart from the radial fin, and aligned with the radial fin in a radial direction of the disk rotor,
the plurality of second fins has a shorter length than the radial fin in the radial direction of the disk rotor,
the radial fin is provided on an inner periphery side of the disk rotor, and the plurality of second fins is provided on an outer periphery side of the disk rotor,
the radial fin is provided over a half or more of a length of the disk rotor in the radial direction thereof,
between circumferentially adjacent two of the plurality of cooling fins, a third fin is provided only on an outer peripheral half of the disk rotor between the radial fin and the plurality of second fins in the radial direction and between two fins of the plurality of second fins in the radial direction, and
inner and outer edges of the third fin radially overlap edges of the radial fin and one of the plurality of the second fins adjacent to each other in the radial direction.

2. The disk rotor of a vehicle brake according to claim 1, wherein
the radial fin is composed of an oval fin having an oval shape.

3. The disk rotor of a vehicle brake according to claim 2, wherein
the plurality of second fins have a perfect or approximately perfect circular shape and are provided in a direction extending from the oval fin.

4. The disk rotor of a vehicle brake according to claim 3, wherein a total of outer peripheral areas of the oval fin, the second fins, and the third fin are larger than an outer peripheral area of a cooling fin that is formed of a single radial fin alone.

5. The disk rotor of a vehicle brake according to claim 2, wherein
a total of outer peripheral areas of the oval fin, the second fins, and the third fin are larger than an outer peripheral area of a cooling fin that is formed of a single radial fin alone.

* * * * *